United States Patent [19]

Thore et al.

[11] Patent Number: 5,628,622
[45] Date of Patent: May 13, 1997

[54] COMPOSITE MATERIAL TURBINE ENGINE BLADE EQUIPPED WITH A SEAL AND ITS PRODUCTION PROCESS

[75] Inventors: Monique A. Thore, Crosne; Pascal C. M. A. Vasseur, Vaux le Penil, both of France

[73] Assignee: Societe Nationale d'Etude et de Construction de Moteurs d'Aviation "Snecma", Paris, France

[21] Appl. No.: 518,175

[22] Filed: Aug. 23, 1995

[30] Foreign Application Priority Data

Sep. 14, 1994 [FR] France ................... 94 10949

[51] Int. Cl.⁶ ........................................ F03B 3/12
[52] U.S. Cl. ............ 416/241 R; 416/230; 416/229 R; 416/224; 415/175.1
[58] Field of Search ............... 416/229 R, 230, 416/241 R, 224; 415/173.1, 173.3, 173.6

[56] References Cited

U.S. PATENT DOCUMENTS

| | | | |
|---|---|---|---|
| 885,032 | 4/1908 | De Ferranti | 415/173.6 |
| 3,117,716 | 1/1964 | Wernicke. | |
| 3,632,460 | 1/1972 | Palfreyman | 416/241 |
| 4,227,703 | 10/1980 | Stalker et al.. | |
| 4,354,804 | 10/1982 | Cruzen. | |
| 5,114,159 | 5/1992 | Baird et al.. | |

FOREIGN PATENT DOCUMENTS

| | | | |
|---|---|---|---|
| 0169394 | 1/1986 | European Pat. Off.. | |
| 379209 | 10/1907 | France. | |
| 2252516 | 6/1975 | France. | |
| 2477226 | 9/1981 | France. | |
| 2481740 | 11/1981 | France. | |
| 2563571 | 11/1985 | France. | |
| 2660371 | 10/1991 | France. | |
| 2691749 | 12/1993 | France. | |
| 0593417 | 11/1977 | Germany | 415/173.6 |
| 0039207 | 3/1979 | Japan | 410/230 |
| 0628323 | 8/1978 | U.S.S.R. | 416/230 |
| 1260554 | 9/1986 | U.S.S.R. | 415/173.1 |
| 1592522 | 9/1990 | U.S.S.R. | 416/230 |
| 775816 | 5/1957 | United Kingdom. | |
| 1303245 | 1/1973 | United Kingdom | 416/224 |

OTHER PUBLICATIONS

Patent Abstracts of Japan, vol. 001, No. 137, Nov. 11, 1977, JP–A–52 077908, Jun. 30, 1977.

*Primary Examiner*—Edward K. Look
*Assistant Examiner*—Mark Sgantzos
*Attorney, Agent, or Firm*—Oblon, Spivak, McClelland, Maier & Neustadt, P.C.

[57] ABSTRACT

A turbine engine blade made from a composite material and having at a free end thereof an integrated brush joint. A process for producing such a blade includes the steps of:

introducing a fibrous fabric into a mold, introducing specific fibres into the mold, in the vicinity of the free end of the blade, injecting a resin into the mold, performing polymerization by use of a heating press of the resin-impregnated fibrous fabric.

8 Claims, 4 Drawing Sheets

COMPOSITE MATERIAL TURBINE ENGINE BLADE EQUIPPED WITH A SEAL AND ITS PRODUCTION PROCESS

BACKGROUND OF THE INVENTION

1. Technical Field

The present invention relates to a composite material turbine engine blade having a brush joint at its free end, as well as to its production process. The invention is used in the aeronautical field.

2. Discussion of the Prior Art

In order to ensure maximum performance characteristics in a aircraft turbine engines, it is indispensable to limit to the greatest possible extent gas leaks between the fixed components and rotary components of said engines. Thus, it is more specifically necessary to limit gas leaks in the fan, low pressure compressor and high pressure compressor of said turbine engine.

FIG. 1 diagrammatically shows an aircraft turbine engine having, in conventional manner, a low pressure compressor 1, a high pressure compressor 3 and a fan 5. The high pressure compressor 3 has a fixed part, namely the stator $3a$, whose blades $3b$ are held by their ends fixed to the casing 2. It also has a rotary part, namely the rotor $3c$, whose blades $3d$ are fixed by their ends fixed to the rotary disks $3e$. In the same way, the low pressure compressor 1 has a fixed stator $1a$ and a rotary rotor $1b$. Moreover, the fan 5 has a rotary blade 6 and a fixed part, the casing 7.

In order to improve the performance characteristics of such turbine engines, the aim is to limit gas leaks between the various rotary components and the fixed components by using seals.

For example, for low and high pressure compressors 1, 3, the aim is generally to limit gas leaks between the stator and rotor. In the case of the fan 5, the aim is to limit gas leaks between the blades 6 and the casing 7.

At present, several seal types are known to the expert. One of these seals is made from an abradable material, i.e. a material having dimpled structures of a honeycomb type, which is positioned on the fixed components of the turbine engine (on the casings or stators) to the right of the rotary components (rotor or blade). FIG. 2 shows one of the seals made from an abradable material.

FIG. 2 shows in longitudinal sectional form a seal of this type applied to a fan. Thus, FIG. 2 diagrammatically shows a fan portion 5 having a casing 7 and a rotary blade 6. The casing 7 houses a seal 8 positioned to the right of the blade 6. This seal 8 is made from an abradable material of the honeycomb type.

However, under the action of the centrifugal and axial forces exerted on the blade 6 and due to the expansion of the materials as a function of ambient temperature, friction of the blade 6 on the abradable seal 8 can lead to a deterioration of the latter, as a result of the relatively fragile constitution of the abradable material. In addition, when the rotation speed of the blade 6 is reduced, the forces and temperature inevitably decrease, so that between the fixed components (namely the casing 7 in FIG. 2) and the rotary components (namely the blade 6) there is a leakage flow into the deteriorated area of the seal 8. This deteriorated zone then constitutes a clearance J between the casing 7 and the blade 6.

Another abradable material seal type is described in FR-A-2 660 371. This document relates to a sealing arrangement placed between the stages of the rotor blades. This sealing arrangement is obtained with a honeycomb material.

Abradable material seals are also described in FR-A-2 563 571, U.S. Pat. No. 4,227,703 and FR-A-2 481 740. These documents describe seals fixed to the rotary components of turbine engines. According to these documents, the blades of the compressors or fan are covered on their free ends with an abrasive coating. Such seals have disadvantages similar to those referred to in connection with FIG. 2, namely that said seals can easily be deteriorated as a result of their constitution, when the seals rub on the fixed components of the turbine engines.

The use of brush joints as seals is also known for limiting gas leaks in turbine engines. Thus, e.g. FR-A-379 209 describes different stages of turbines having mobile blades at the free end of each of which is added a ring equipped with a brush joint. However, such a brush joint is simply connected to the free end of the blade. Moreover, during sudden changes of engine speed or in the case of a sudden contact with the fixed part, the brush joint can be torn away from said blade. The brush joint which is then free within the turbine engine can obviously give rise to serious damage.

Numerous other document such as FR-A-2 477 226, EP-A-169 394 and FR-A-2 691 749 describe seals constituted by brush joints connected to the rotors. The disadvantages of these brush joints are substantially identical to those of the brush joint of FR-A-379 209.

SUMMARY OF THE INVENTION

The object of the present invention is to obviate the disadvantages of the aforementioned seals. To this end, it proposes a turbine engine blade made from a composite material and incorporating an integrated brush joint.

More specifically, the invention relates to a composite material turbine engine blade produced from a fabric of multidirectional fibers impregnated with a resin and having a blade body with a fixed end and a free end. This turbine engine blade is characterized in that it has, at the free end of the blade body, a seal integrated into the resin.

Advantageously, the seal has a plurality of specific fibers, which are in part integrated into the resin and in part external of the blade body in order to form a brush.

According to the invention, the specific fibers are integrated in the resin with an angle $\propto$ opposite to the turbine engine rotation direction.

According to an embodiment of the invention, in the vicinity of the free end of the blade body, a portion of the fibrous fabric is not covered with resin, so as to form, with the specific fibers, a denser brush.

According to an embodiment of the invention, the specific fibers are metallic.

The invention also relates to a process for the production of such a composite material turbine engine blade equipped with a seal. This process is characterized by:

introducing a fibrous fabric into a mold, introducing specific fibers into the mould in the vicinity of the free end of the blade, injecting a resin into the mould, performing a polymerization under a heating press of the resin-impregnated fibrous fabric.

Advantageously, said process can have a working or machining operation for adjusting the length of the fibers.

According to the invention, said process can consist of dissolving, by etching in an acid bath, resin in order to obtain a chosen brush length.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

The blades according to the invention are made from composite material, i.e. are produced by means of woven fibers impregnated with a resin. Numerous documents describe processes for the production of composite material blades, e.g. FR-A-2 684 719, FR-A-2 682 992 and U.S. Pat. No. 4,354,804.

As composite materials have the advantage of being thermally resistant, composite material blades can consequently be used in relatively cold areas of turbine engines, such as compressors.

Figure 3C:
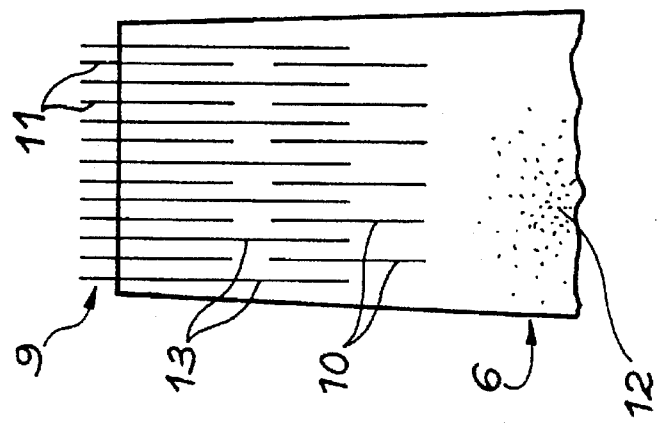
FIGS. 3A, 3B and 3C in each case show an embodiment of a blade equipped with an integrated brush joint.
Figure 3B:
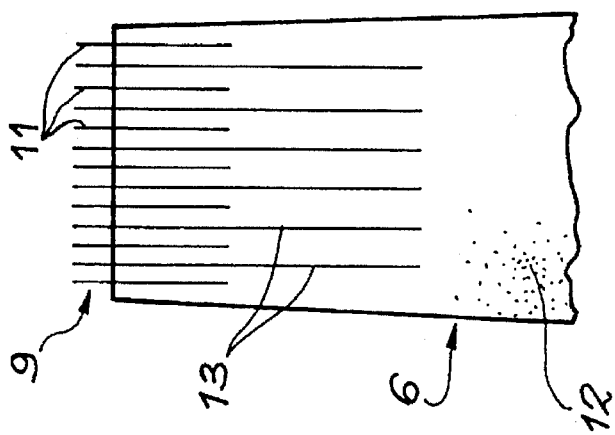
Figure 3A:
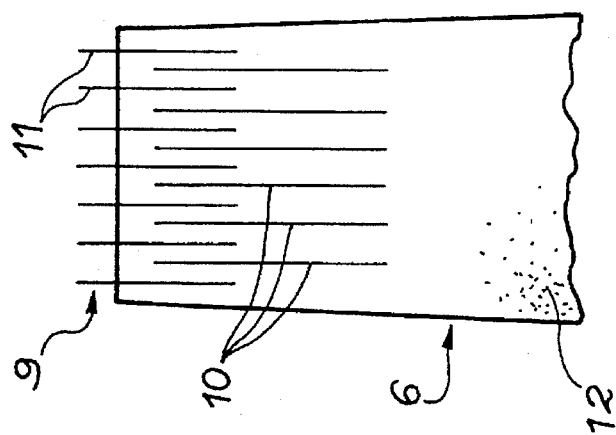

FIGS. 3A, 3B and 3C very diagrammatically show a longitudinal sectional view of the free end of three blades, each having a brush joint produced according to a different embodiment of the invention.

Figure 1:
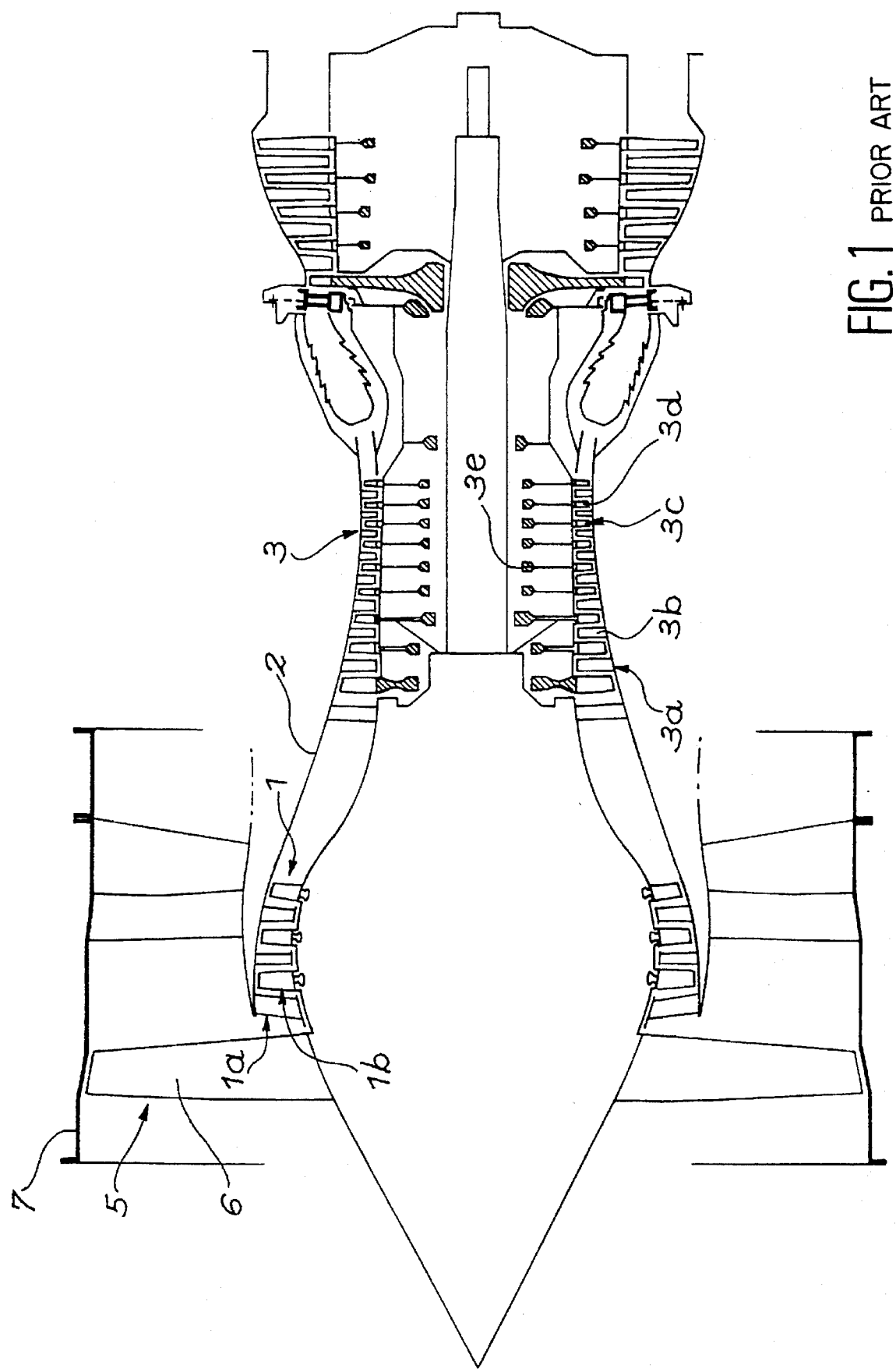
FIG. 1, already described, diagrammatically shows a general view of a prior art aircraft turbine engine.
Figure 2:
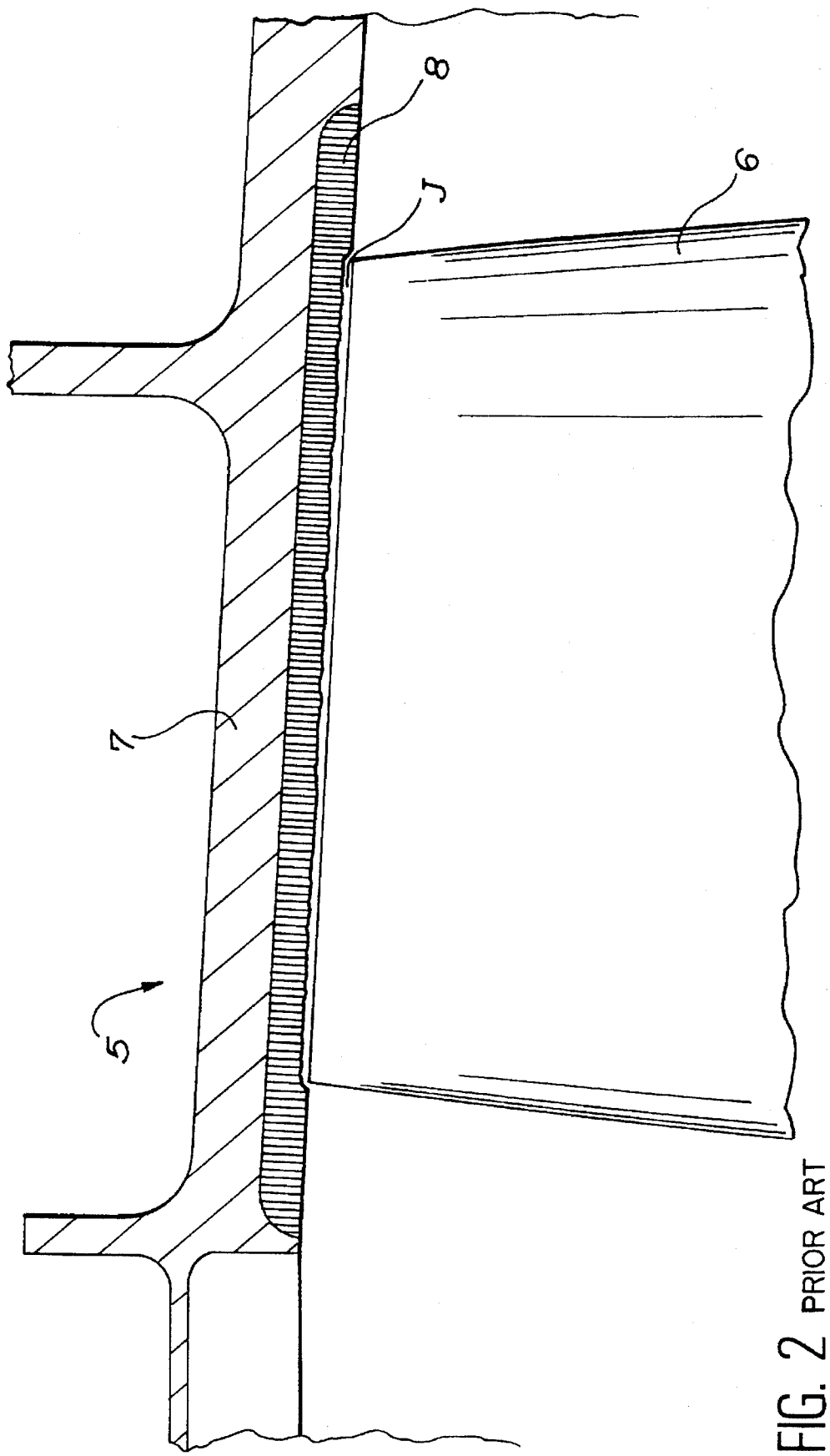
FIG. 2, already described, diagrammatically shows a prior art, abradable seal.

FIG. 3A shows the free end of the blade 6 of the fan 5 shown in FIG. 1. This composite material blade 6 is consequently constituted by a fibrous fabric 10 impregnated with a resin 12. In the present description, these fibers 10 are called the basic fibres of the composite material.

FIG. 3A also shows supplementary fibers 11, also called specific fibers or connected fibers. These specific fibers 11 are integrated into the composite material producing the blade 6. As can be seen, these specific fibers 11 are partly introduced into the resin 12 of the composite material. Moreover, a portion of said specific fibers 11 is external of the blade 6, i.e. it projects beyond the blade. The portion of the fibers 11 beyond the blade constitutes a brush 9 (or brush joint).

FIG. 3B shows a second embodiment of the brush joint 9 of the blade 6. According to this embodiment, the brush 9 is produced on the one hand by means of specific fibers 11 and on the other by means of reinforcing fibers 13. These reinforcing fibers 13 are fibers constituting the composite material and having a length exceeding that of the basic fibers 10 shown in FIG. 3A. Thus, said reinforcing fibers 13 project to the outside of the blade 6, like the specific fibers 11 in such a way as to densify the brush 9 produced by said specific fibers 11.

FIG. 3C shows a third embodiment of the brush joint 9 of a composite material blade 6. According to this embodiment, the brush joint 9 is produced, every other fold, by means of specific fibers 11 and basic fibers 10 and every other fold by means of reinforcing fibers 13. This means that every other "bristle" of the brush 8 is a reinforcing fiber 13 and every other "bristle" of the brush 9 is a specific fiber 11. In this final fold, each specific fiber 11 is aligned with a basic fiber 10. Thus, the blade 6 is produced by means of a fibrous fabric including both basic fiber 10 and reinforcing fiber 13. Such an embodiment makes it possible to obtain a denser brush joint 9 than that shown in FIG. 3A.

The process for producing such brush joints directly integrated into the blade consequently comprises:

depositing in a mold a fabric of basic fibers 10 and/or reinforcing fibers 13, which can e.g. have superimposed folds or form a multidirectional texture, depositing in said same mold in the vicinity of the free end of the blade connected fibers 11, injecting resin into mold in order to impregnate the fibers therewith, carrying out a polymerization under a heating press of the thus obtained, preimpregnated fibrous fabric.

It is then possible to carry out a machining or working of the impregnated fibrous fabric so as to bring to the desired length the "bristles" of the brush joint, i.e. the specific fibers 11 (as well as, in certain cases, the reinforcing fibers 13) producing the brush joint. Advantageously, the impregnated fibrous fabric can be machined in inclined manner to give the brush a certain inclination.

This is followed by dissolving part of the resin by soaking the impregnated, machined fibrous fabric in an acid bath so that, by etching, the resin is dissolved over a desired length, so that it is in this way possible to obtain the chosen brush bristle length.

Figure 4:
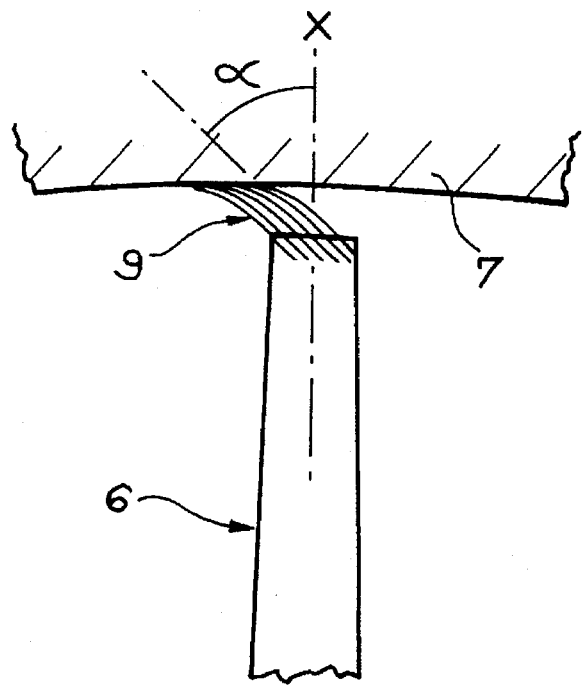
FIG. 4 is a front view of a brush joint according to the invention showing the supply of the joint with respect to the fixed component.

FIG. 4 shows in a front view of the turbine engine, a free end of a blade 6 having a brush joint 9 inclined by an angle $\propto$ relative to the axis X of the blade 6. This angle $\propto$ is opposite to the rotation direction of the blade 6. Therefore, when the blade 6 is rotating, the brush 9 rubs on the track of the casing 7, which ensures a good sealing action, because the brush 9 is permanently in contact with the casing 7.

Figure 5:
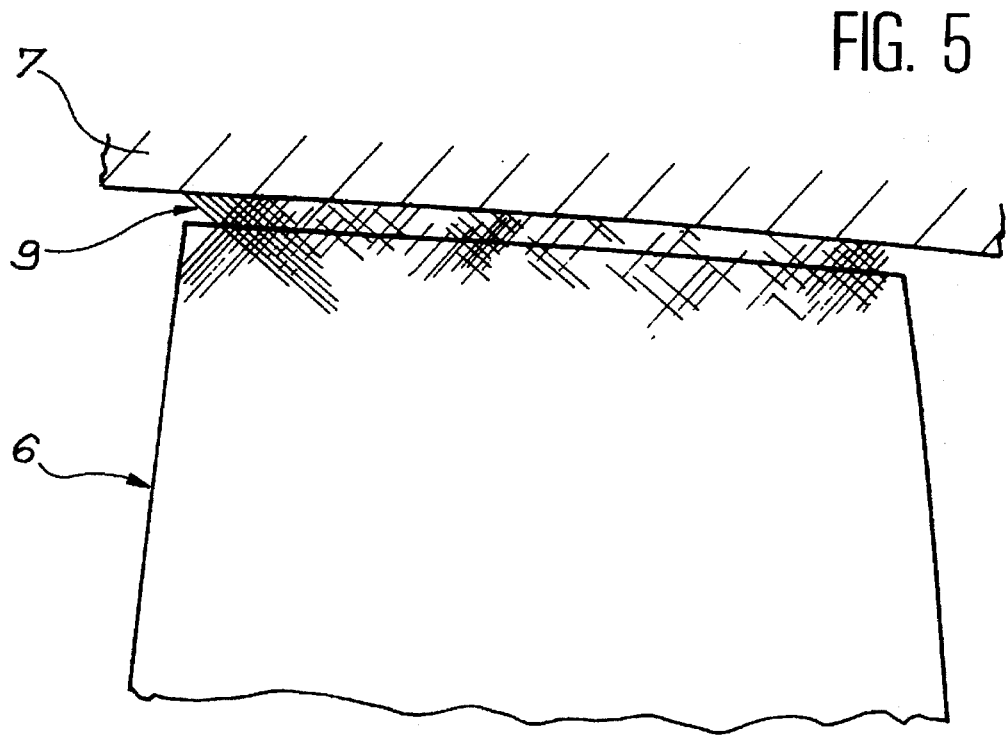
FIG. 5 diagrammatically shows an embodiment of a brush joint according to the invention.

FIG. 5 shows in a longitudinal sectional view of the turbine engine, the free end of the blade 6 with, in part, the fibrous fabric producing the brush joint 9. Thus, FIG. 5 shows the embodiment in which the fibrous fabric has superimposed folds or a multidirectional texture. More specifically, FIG. 5 shows that the fibers producing, both the composite material of the blade 6 and the brush joint 9, can be woven in multidirectional manner, which provides a brush joint 9 with a better sealing action and a more sturdy blade 6.

The casing 7 and in general all the components against which the brush joints according to the invention rub, are metallic or made from a composite material having a metallic track at the location where the brush joints 9 rub, the friction tracks to the right of the brush joints having to have a good polished surface state, so as to permit an optimum sealing.

According to an embodiment of the brush joint according to the invention, the connected fibers are metallic fibers. In this case, the casing 7 or any component against which a brush joint is in contact has a track which has received a very smooth chromium carbide deposit.

The brush joints according to the invention have the advantage of being easy to repair or more precisely easy to replace. The replacement of a brush joint on a composite material blade takes place:

by dissolving the resin at the free end of the blade in an acid bath, by eliminating any connected fibers and optionally damaged reinforcing fibers, by integrating new connected fibers and optionally new reinforcing fibers, by injecting new resin in the vicinity of the free end of the blade, then machining and dissolving by etching, as for the aforementioned brush joint production process.

The brush joints according to the invention have been described hereinbefore in the case where they are integrated in the free end of a mobile blade, i.e. a fan or compressor blade.

However, it is obvious to the expert that such brush joints can be integrated onto fixed blades like those of fixed rectifiers of low pressure compressors or the first stages of high pressure compressors.

In general terms, the brush joints according to the invention can be produced for all types of fixed or mobile components, if the latter are made from composite materials.

On mobile blades, the use of the integrated brush joints according to the invention makes it possible to replace the abradable material of the fixed components by a simple rubbing or abrading track, so that the turbine engine casing can be considerably lightened. For example, for a casing with a radius of 1050 mm, it can be lightened by 10.7 kg.

The use of these brush joints in mobile blades also makes it possible to eliminate any running-in phase, which was necessary in the case of abradable material joints. Moreover, the brush joints ensure a seal for all engine speeds, because the joint is "elastic" due to the inclination of the brush bristles.

On fixed rectifiers, the use of brush joints permits an overhanging rectifier installation instead of end-guided rectifiers.

The use of such brush joints also brings about a significant weight loss and a simplification of the compression rotor. Moreover, the use of these brush joints in place of an inter-blade labyrinth, makes it possible to eliminate the abradable support, as well as the generally used rubbing fin sealing device.

In general terms, no matter what the blade type on which these brush joints are installed, their use simplifies the production of the blade and permits a repair or simply an easy replacement of such brush joints.

We claim:

1. A molded composite machine turbine engine blade, which comprises:

a multidirectional fibrous fabric blade impregnated with a resin and having a blade body wherein at a free end of the blade body, a seal is integrated into the resin and forms a brush joint between the blade body and a casing.

2. Composite turbine engine blade according to claim 1, wherein the seal comprises a plurality of fibers, which are partly integrated into the resin and partly external of the blade body, said fibers forming a brush.

3. A molded composite machine turbine engine blade, which comprises:

a multi-directional fibrous fabric blade impregnated with a resin and having a blade body wherein at a free end of the blade body, a seal is integrated into the resin, said seal comprising a plurality of fibers which are partly integrated into the resin and partly external of the blade body, and said fibers forming a brush, wherein said fibers are integrated into the resin at an angle $\alpha$ opposite to the turbine engine rotation direction.

4. Composite turbine engine blade according to claim 2, wherein, in proximity with the free end of the blade body, reinforcing fibers are located so as to form a denser brush.

5. A composite turbine engine blade according to claim 1, wherein said free end comprises a longitudinal free end of said blade body and wherein free ends of said fabric extend from said free end of said blade.

6. Process for producing a composite material turbine engine blade having a seal, which comprises:

introducing a fibrous fabric into a mold, introducing fibers into the mold in proximity with a longitudinal free end of said blade, injecting a resin into the mold so as to form the blade such that said fabric has free ends which extend from said longitudinal free end of said blade, performing polymerization under a heating press of the resin-impregnated fibrous fabric.

7. Process according to claim 6, which comprises adjusting a length dimension of the fibers by machining.

8. Process according to claim 6, which comprises dissolving, by etching in an acid bath, the resin in such a way as to obtain a brush at the free end of the blade.

* * * * *